(12) United States Patent
Chen

(10) Patent No.: US 7,880,768 B2
(45) Date of Patent: Feb. 1, 2011

(54) MOBILE COMMUNICATION TERMINAL

(75) Inventor: Ga-Lane Chen, Santa Clara, CA (US)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 466 days.

(21) Appl. No.: 11/959,137

(22) Filed: Dec. 18, 2007

(65) Prior Publication Data
US 2008/0151061 A1    Jun. 26, 2008

(30) Foreign Application Priority Data
Dec. 25, 2006    (CN)    ......................... 2006 1 0201390

(51) Int. Cl.
*H04N 5/228* (2006.01)
*G03B 17/00* (2006.01)
(52) U.S. Cl. .............................. 348/208.1; 348/208.99; 396/52; 396/53; 396/55
(58) Field of Classification Search . 348/208.1–208.16, 348/345–357; 396/52–55
See application file for complete search history.

(56) References Cited

U.S. PATENT DOCUMENTS

| | | | | |
|---|---|---|---|---|
| 5,365,303 | A * | 11/1994 | Yamasaki et al. ............. | 396/53 |
| 5,445,006 | A * | 8/1995 | Allen et al. .................. | 73/1.38 |
| 6,972,797 | B2 * | 12/2005 | Izumi ......................... | 348/348 |
| 2002/0186304 | A1 * | 12/2002 | Kono et al. ............... | 348/216.1 |
| 2004/0046953 | A1 * | 3/2004 | Nagata et al. .............. | 356/4.01 |
| 2005/0212911 | A1 * | 9/2005 | Marvit et al. ............... | 348/154 |
| 2006/0098967 | A1 * | 5/2006 | Togawa ....................... | 396/55 |
| 2007/0051182 | A1 * | 3/2007 | Egawa et al. ................. | 73/777 |

* cited by examiner

*Primary Examiner*—Sinh Tran
*Assistant Examiner*—Christopher K Peterson
(74) *Attorney, Agent, or Firm*—Jeffrey T. Knapp

(57) ABSTRACT

The mobile communication terminal includes a body, a lens module, a first accelerator sensor, a second accelerator sensor, a range finder, and a processor. The lens module, the first accelerator sensor, a second accelerator sensor, and a range finder are disposed on the body. The lens module is configured to pick up an image of an object. The first accelerator sensor and the second accelerator sensor are configured to measure accelerations of the lens module in different directions. The range finder is configured to measure a distance from the object to the lens module. The processor electrically coupled to the range finder module, the first accelerator sensor and the second accelerator sensor. The processor is configured to restore the image blurred by vibrations of the lens module based on values of the distance, the first acceleration, and the second acceleration.

12 Claims, 7 Drawing Sheets

MOBILE COMMUNICATION TERMINAL

BACKGROUND

1. Field

The invention relates generally to mobile communication terminals, and more particularly to a mobile communication terminal capable of restoring a blurred image caused by the terminal vibration.

2. Description of Related Art

Currently, mobile communication terminals, such as personal digital assistants (PDAs), cellular telephones, etc., are becoming indispensable products for people in modern life. Along with the increasingly widespread use of such devices, there is a demand for developing multifunctional mobile communication terminals. According, the mobile communication terminal equipped with an image pickup device has been developed in recent years.

When picking up an image of an object, any causes of the image pickup device vibration, e.g. hand shake, will result in blurring of the image. Because the image represents an integration of all positions of the object over the period of exposure, the blurred image is caused by a relative motion between the image pickup device and the object. Specifically, vibration of the image pickup device causes the optical axis to displace. Thus, a given location on an image sensor of the image pickup device, which receives light (image signals) corresponding to one position of the object, is varied over the period of exposure. Therefore, a single location of the image sensor will constantly receive different image signals, whereby the image of the object looks blurred or smeared along the direction of the relative motion.

What is needed, therefore, is a mobile communication terminal with an image pickup device capable of rectifying the effects of blurring in picked up images which are due to vibrations applied to the device.

SUMMARY

A mobile communication terminal is provided. In one present embodiment, the mobile communication terminal includes a body, a lens module, a first accelerator sensor, a second accelerator sensor, a range finder, and a processor. The lens module, the first accelerator sensor, the second accelerator sensor, and the range finder are disposed on the body. The lens module is configured to pick up an image of an object. The first accelerator sensor is configured to measure a first acceleration of the lens module in a first direction. The second accelerator sensor is configured to measure a second acceleration of the lens module in a second direction. The range finder is configured to measure a distance from the object to the lens module. The processor is electrically coupled to the range finder module, the first accelerator sensor and the second accelerator sensor. The processor is configured to restore the image blurred by vibrations of the lens module based on values of the distance, the first acceleration, and the second acceleration.

Other advantages and novel features of the present mobile communication terminal will become more apparent from the following detailed description of preferred embodiments when taken in conjunction with the accompanying drawings.

BRIEF DESCRIPTION OF THE DRAWINGS

The components in the drawings are not necessarily drawn to scale, the emphasis instead being placed upon clearly illustrating the principles of the present invention.

Figure 1:
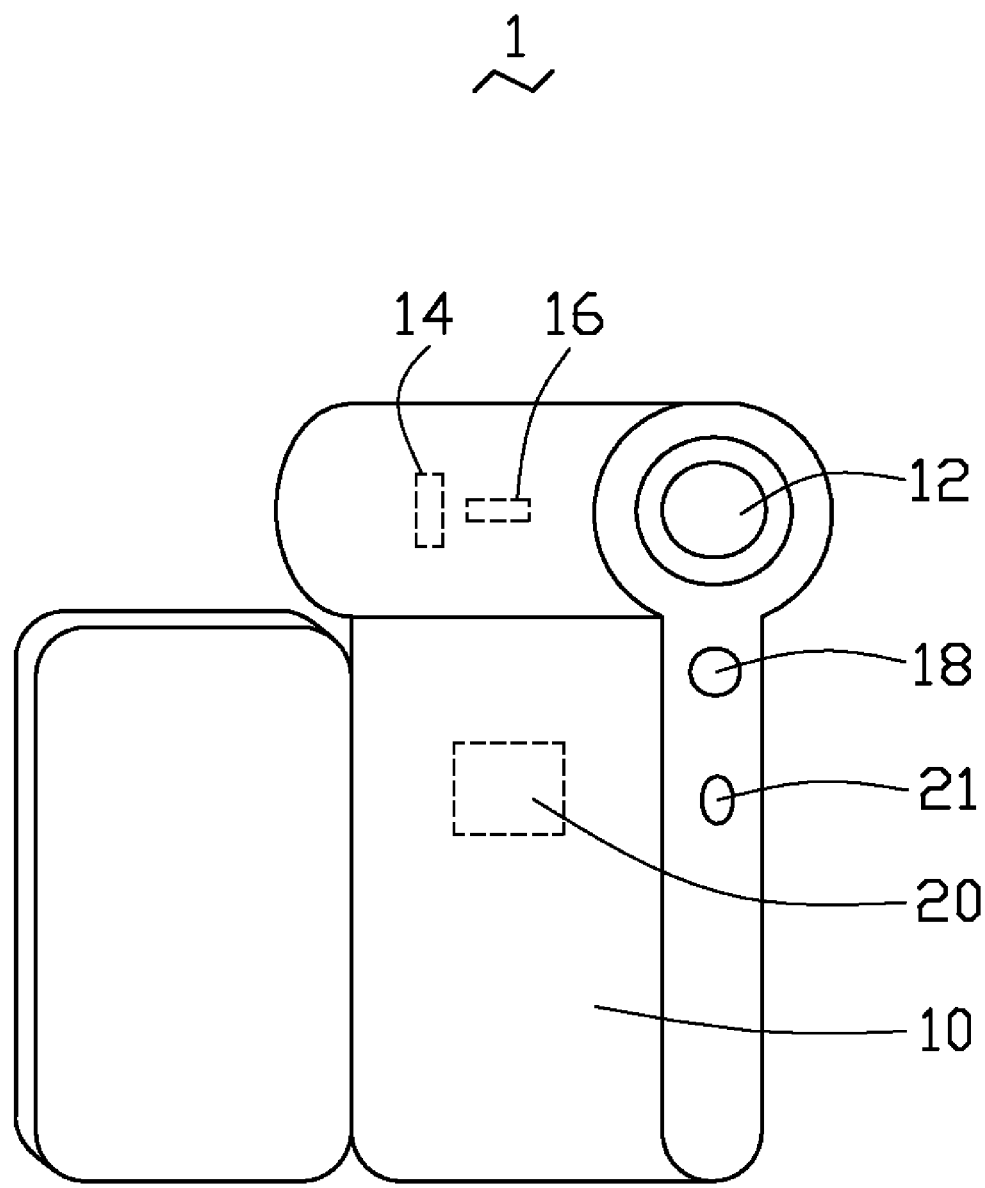
FIG. 1 is a schematic view of a mobile communication terminal in accordance with an embodiment of the present invention.

Corresponding reference characters indicate corresponding parts. The exemplifications set out herein illustrate at least one preferred embodiment of the present mobile communication terminal, in one form, and such exemplifications are not to be construed as limiting the scope of the invention in any manner.

DETAILED DESCRIPTION OF THE EMBODIMENTS

Reference will now be made to the drawings to describe embodiments of the present mobile communication terminal in detail.

Referring to FIG. 1, a mobile communication terminal 1 in accordance with a present embodiment is shown. The mobile communication terminal 1 includes a body 10, a lens module 12, a first accelerator sensor 14, a second accelerator sensor 16, a range finder 18, and a processor 20. In the present embodiment, the mobile communication terminal 1 can be a cellular telephone or a personal digital assistant (PDA).

Figure 2:
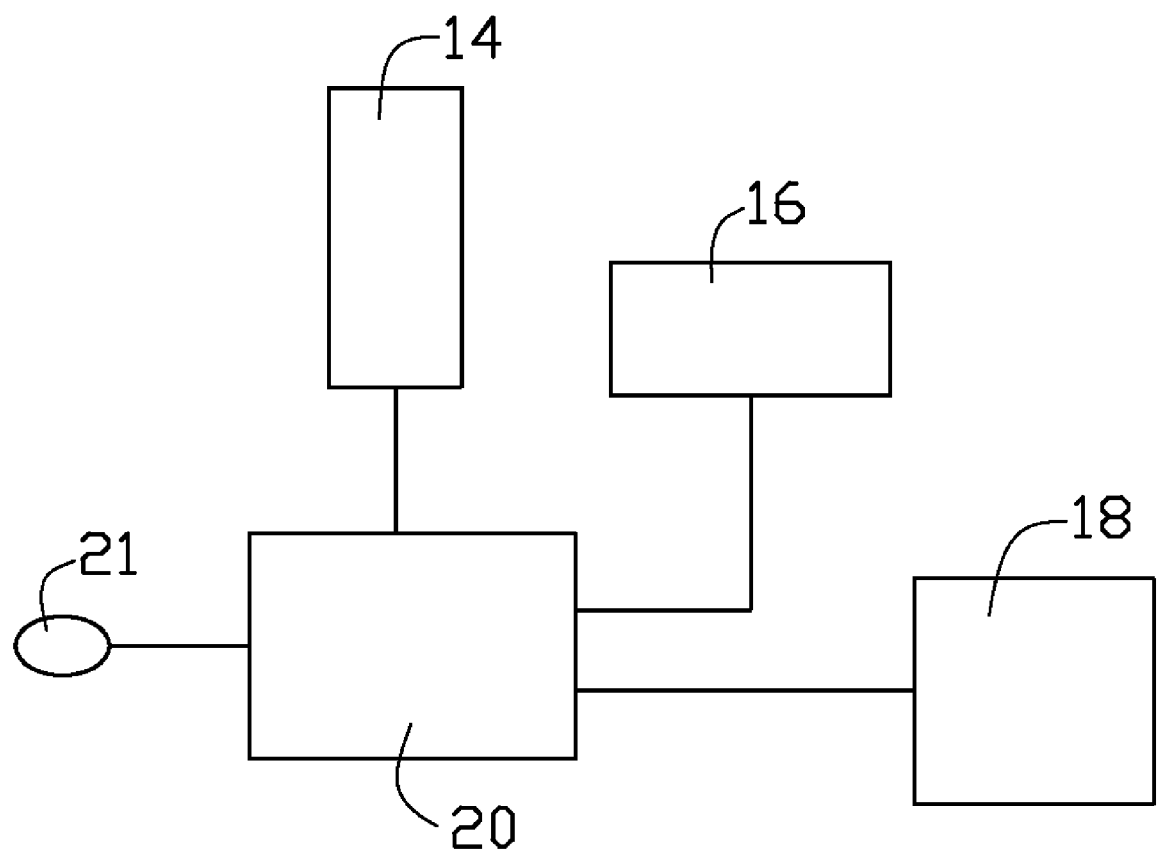
FIG. 2 is a schematic view of connections between elements of the mobile communication terminal of FIG. 1.

In the present embodiment, the lens module 12, the first accelerator sensor 14, the second accelerator sensor 16, and the range finder 18 are disposed on the body 10. Referring to FIG. 2, the processor 20 is electrically coupled to the range finder 18, the first accelerator sensor 14 and the second accelerator sensor 16, respectively. The first accelerator sensor 14 and the second accelerator sensor 16 can connect with the lens module 12 (not shown in FIG. 1).

The range finder 18 is configured to measure a distance from an object to the lens module 12. The lens module 12 is configured to pick up an image of the object. That is, the lens module 12 uses the range finder 18 to judge a focusing distance and then take the image of the object in focus. In this case, the lens module 12 can be an autofocus lens module. In addition, the range finder 18 can be an infrared range finder, a laser infrared range finder or an ultrasonic range finder.

When the lens module 12 has an acceleration force applied thereto, the first acceleration sensor 14 is configured to measure a first acceleration of the lens module 12 in a first direction. The second acceleration sensor 16 is configured to measure a second acceleration of the lens module 12 in a second direction. In the present embodiment, the first direction and the second direction are perpendicular to each other. In addition, the first direction and the second direction are perpendicular to an optical axis of the lens module 12. Thus, the accelerations of the lens module 12 in two axes which are both perpendicular to the optical axis can be measured by the first acceleration sensor 14 and the second acceleration 16, respectively. For example, the first acceleration sensor 14 measures an acceleration of the lens module 12 along an X-axis while the second acceleration sensor 16 measures an acceleration of the lens module 12 along a Y-axis. In such case, the optical axis of the lens module 12 is parallel to a Z-axis.

According to different mechanisms, each of the acceleration sensors 14, 16 can be a piezoresistive acceleration sensor, a capacitive acceleration sensor, a pendulous acceleration sensor, or a tunnel acceleration sensor.

Figure 3:
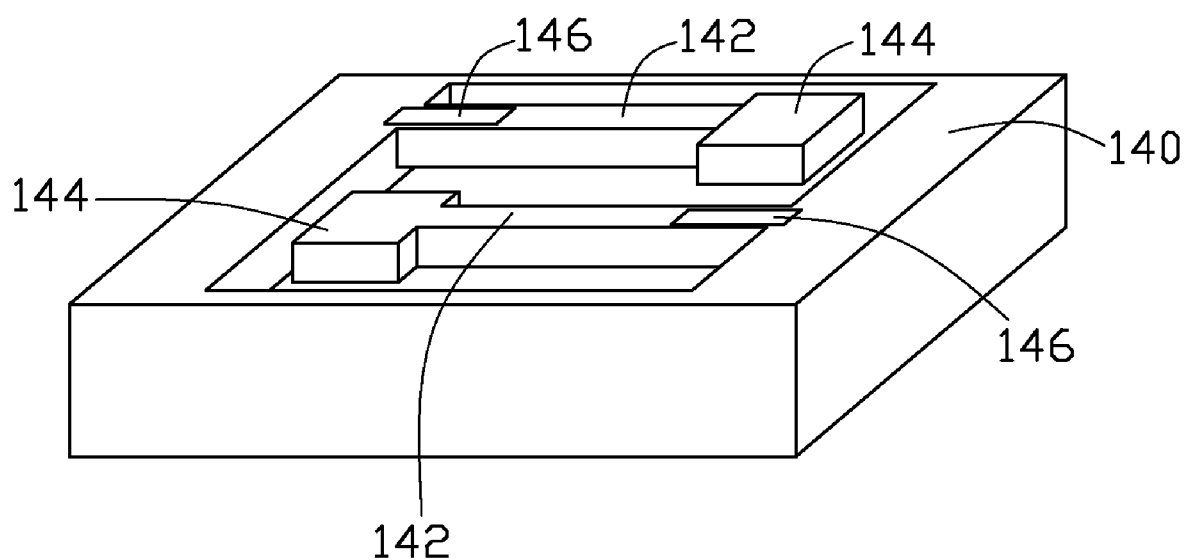
FIG. 3 is a schematic view of an accelerator sensor of the mobile communication terminal of FIG. 1.

Referring to FIG. 3, piezoresistive acceleration sensors are employed to serve as the acceleration sensors 14, 16 of the present embodiment. Each of the piezoresistive acceleration sensors includes a base 140, at least one diaphragm 142, at least one mass 144, and at least one piezoresistive element 146. An end of the diaphragm 142 is fastened to one side of the base 140 while an opposite end of the diaphragm 142 is connected with the mass 144. The piezoresistive element 146 is attached on the diaphragm 142. In the present embodiment, the piezoresistive acceleration sensor includes two diaphragms 142, as shown in FIG. 3. The diaphragms 142 are disposed in parallel and fastened to two opposite sides of the base 140. In addition, the piezoresistive acceleration sensor of the present embodiment includes two masses 144 and two piezoresistive elements 146. Each of the masses 144 and each of the piezoresistive elements 146 is disposed according to the manner mentioned above.

Figure 4:
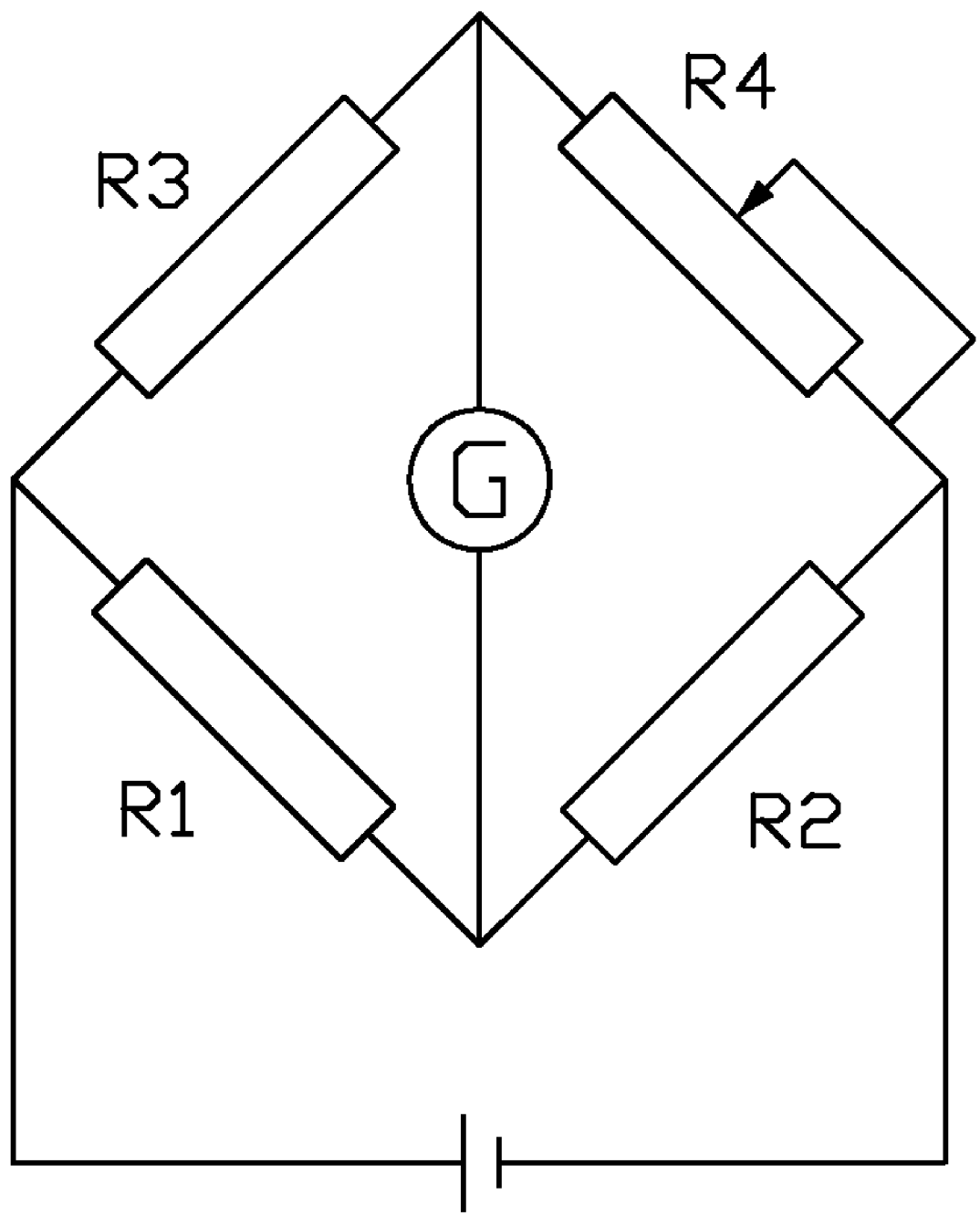
FIG. 4 is a schematic view of a Wheatstone bridge circuit of the accelerator sensor of FIG. 3.

Referring to FIG. 3 and FIG. 4, the piezoresistive elements 146 are electrically coupled to a Wheatstone bridge circuit. Two piezoresistive elements 146 act as two legs of such bridge circuit. The acceleration is measured by a change in electrical resistance resulting from applying a mechanical stress on the piezoresistive acceleration sensor 14 or 16. In particular, when an acceleration force is applied on the piezoresistive acceleration sensor 14 or 16, the diaphragms 142 are deformed and then the piezoresistive elements 146 are deflected accordingly. As a result, a change in resistance is caused by the piezoresistive effect.

Referring to FIG. 4, a schematic view of the Wheatstone bridge circuit is shown. $R_1$ and $R_2$ represent resistances of the two piezoresistive elements 146. In addition, $R_3$ is a resistor with known resistance and $R_4$ is an adjustable resistor with adjustable resistance. When the piezoresistive effect is generated, the changes in resistance $\Delta R$ of $R_1$ and $R_2$ disrupt the balance of the bridge circuit. The resistance $R_4$ will vary until the bridge is balanced again. In the present embodiment, if $R_1$ is increased and $R_2$ is decreased, a relationship is established as shown in the following equation:

$$\frac{(R_1 + \Delta R)}{(R_2 - \Delta R)} = \frac{R_3}{R_4}$$

Accordingly, the change in resistance $\Delta R$ caused by the piezoresistive effect is then calculated using the following equation:

$$\Delta R = \frac{(R_2 \times R_3 - R_1 \times R_4)}{(R_3 + R_4)}$$

As mentioned above, $\Delta R$ corresponds to the magnitude of deformation of the piezoresistive elements 146. In addition, the magnitude of deformation of the piezoresistive elements 146 and the applied acceleration force are in direct proportion. Accordingly, the accelerations of the lens module 12 can be obtained.

In the present embodiment, each of the piezoresistive acceleration sensors 14, 16 arranged in the above-described manner provides a great difference in the change of resistance between the two piezoresistive elements 146, because the change in resistance of one of the piezoresistive elements 146 is increased while that of the other piezoresistive element 146 is decreased. Thus, the sensitivity of the acceleration sensors 14, 16 is improved.

The processor 20 connected with the range finder 18, the first acceleration sensor 14, and the second acceleration sensor 16 is a central processing unit (CPU). Alternatively, the processor 20 can be a digital signal processor (DSP). The processor 20 is configured to restore the image blurred by vibrations of the lens module 12 according to the values of the distance from the object to the lens module 12 and the accelerations of the lens module 12 in the two axes. Principally, the processor 20 is provided to correct the effect of blurring in the picked up image according to the displacement of the optical axis of the lens module 12.

Furthermore, the mobile communication terminal 1 can also include a switch 21 connected to the processor 20, as shown in FIG. 1 and FIG. 2. The switch 21 is configured to control whether anti-blur function of the mobile communication terminal 1 is disabled or enabled.

For allowing the present embodiment to be understood fully, how the mobile communication terminal 1 of the present embodiment is capable of performing the rectifying of the blurred effects in picked up images in practice is described in more detailed below.

When picking up an image of an object, the lens module 12 generates acceleration due to an acceleration force applied thereon. The acceleration of the lens module 12 corresponds to the acceleration force applied. During a period of time $\Delta t$, which is less than or equal to a period of exposure time of the lens module 12, the acceleration of the lens module 12 can be assumed to be constant if $\Delta t$ is very short. The velocity V of the lens module 12 can be estimated using the following equation:

$$V = V_t + a_t \times \Delta t$$

where $V_t$ is a velocity of the lens module 12 at a predetermined time t, and $a_t$ is an acceleration of the lens module 12 in one direction, e.g. along the X-axis, at the predetermined time t.

Thus, a displacement $\Delta S$ of the lens module 12 over the period of time $\Delta t$ can be calculated according to the following equation:

$$\Delta S = (2V_t + a_t \times \Delta t) \times \frac{1}{2} \Delta t$$

where $V_t$ is the velocity of the lens module 12 at the predetermined time t, $a_t$ is the acceleration of the lens module 12 along the X-axis at the predetermined time t, and $\Delta t$ is the period of time during which the lens module 12 is displaced. In this case, the calculation mentioned above is performed by the processor 20. In the present embodiment, the displacement $\Delta S$ of the lens module 12 caused by vibration can be measured in real time.

Figure 5:
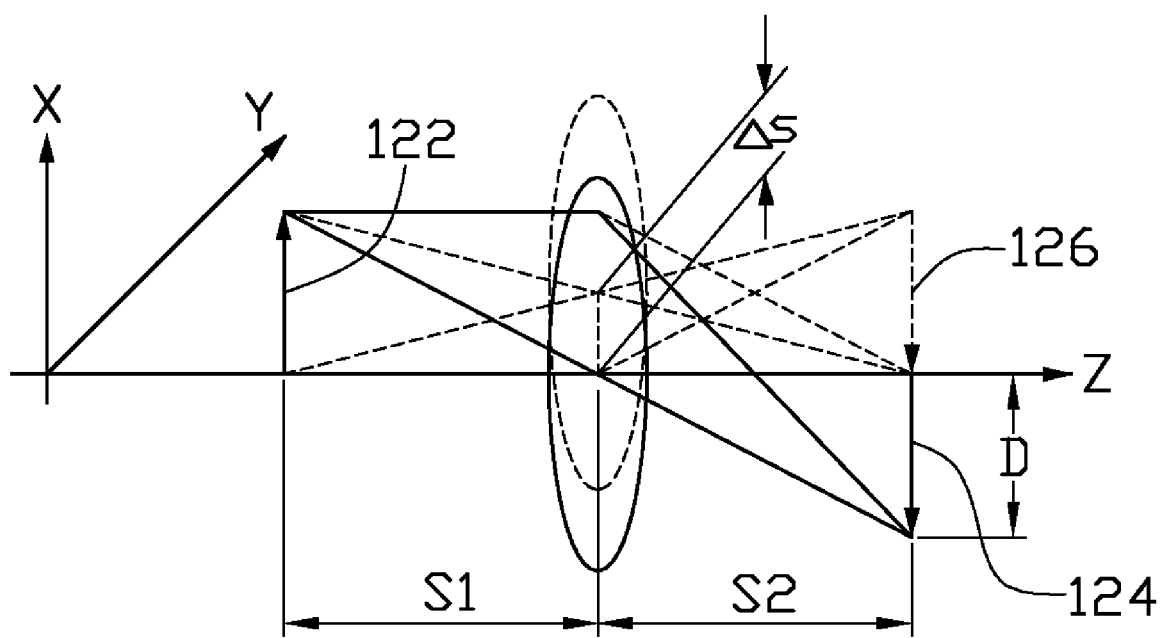
FIG. 5 is a schematic view of optical paths of images picked up by the mobile communication terminal of FIG. 1.

Referring to FIG. 5, this is a schematic view showing optical paths of the lens module 12 when picking up an image of an object 122. The image 124 of the object 122 is assumed to be formed at the beginning of the exposure. The image 126 of the object 122 is a shift image formed when the vibration of the lens module 12 occurs. It is assumed that the distance from the object 122 to the lens module 12 and from the images 124, 126 to the lens module 12 are $S_1$ and $S_2$, respectively. The displacement D of the image 126 relative to the image 124 over the period of time Δt can be calculated according to the following formula:

$$\frac{\Delta S}{D} = \frac{S_1}{S_1 + S_2}$$

where ΔS is the displacement of the lens module 12 over the period of time Δt.

Figure 6:
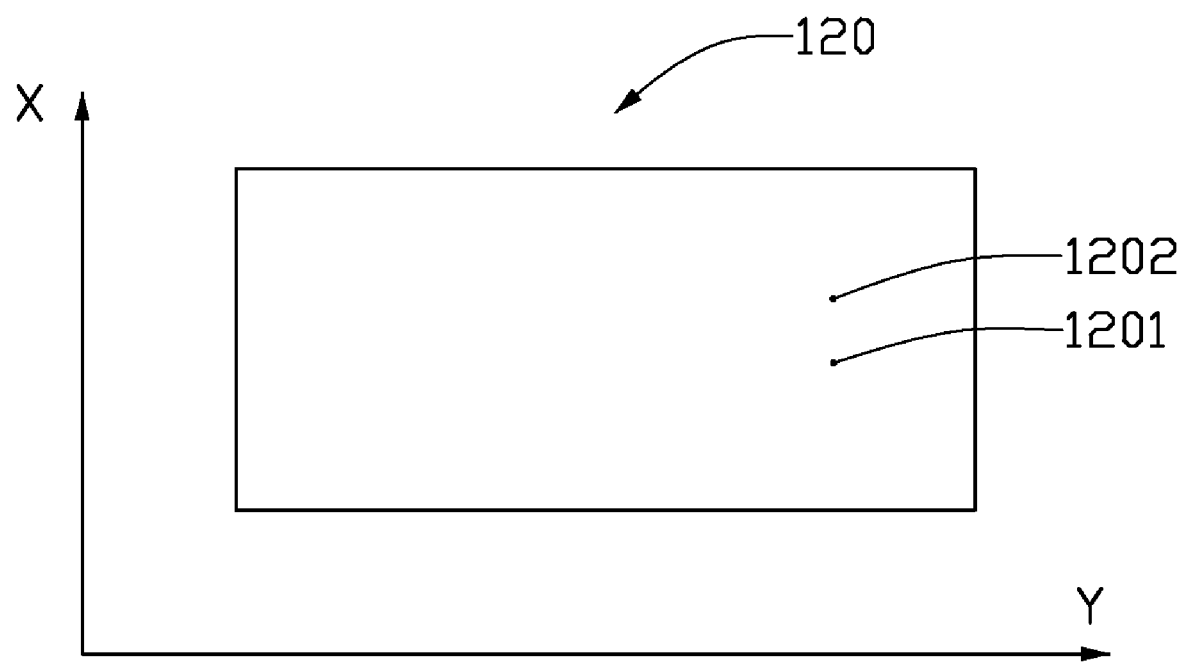
FIG. 6 is a schematic view of displacement of an image signal.

Referring to FIG. 6, a schematic view showing the image detected on an image sensor 120 of the lens module 12 is shown. When the lens module 12 vibrates along the X-axis over a period of time Δt, a point image representing one position of the object 122 is assumed to shift from the point 1201 to the point 1202. The displacement $D_1$ of the point image can be calculated using the following equation:

$$D_1 = \frac{\Delta S \times (S_1 + S_2)}{S_1}$$

where ΔS is the displacement of the lens module 12 over the period of time Δt, $S_1$ is the distance from the object 122 to the lens module 12, and $S_2$ is the distance from the image 124, 126 to the lens module 12.

However, once the lens module 12 vibrates, the image sensor 120, which receives light to form an image, also vibrates accordingly. That is, the image shifts on the moving image sensor 120. Therefore, as mentioned above, the net displacement $D_n$ of the point image is modified as follows:

$$D_n = \frac{\Delta S \times (S_1 + S_2)}{S_1} - \Delta S$$

As mentioned above, once the net displacement $D_n$ of the image is obtained, the processor 20 is configured to integrate the signal of the image at the point 1202 with that at the point 1201. For example, the image is formed by integrating the signal over a period of time Δt with the signal at the beginning of exposure. Compared to conventional art, which continuously integrates the signals of the image received on the same position of the image sensor 120 over the exposure time, the mobile communication terminal 1 of the present embodiment corrects the signals of the image by the way of detecting the displacement of the signals of the image of the object 122 and then integrating the signals of the image shifted with those at the beginning of exposure. In the present embodiment, the correction of the signals of the image safeguard against blurred image formation is performed all the exposure time.

The above-described way of correcting the image signals shifted along the X-axis is an illustrative example. Image signals shifted along the Y-axis also can be corrected according to the way described above.

Figure 7:
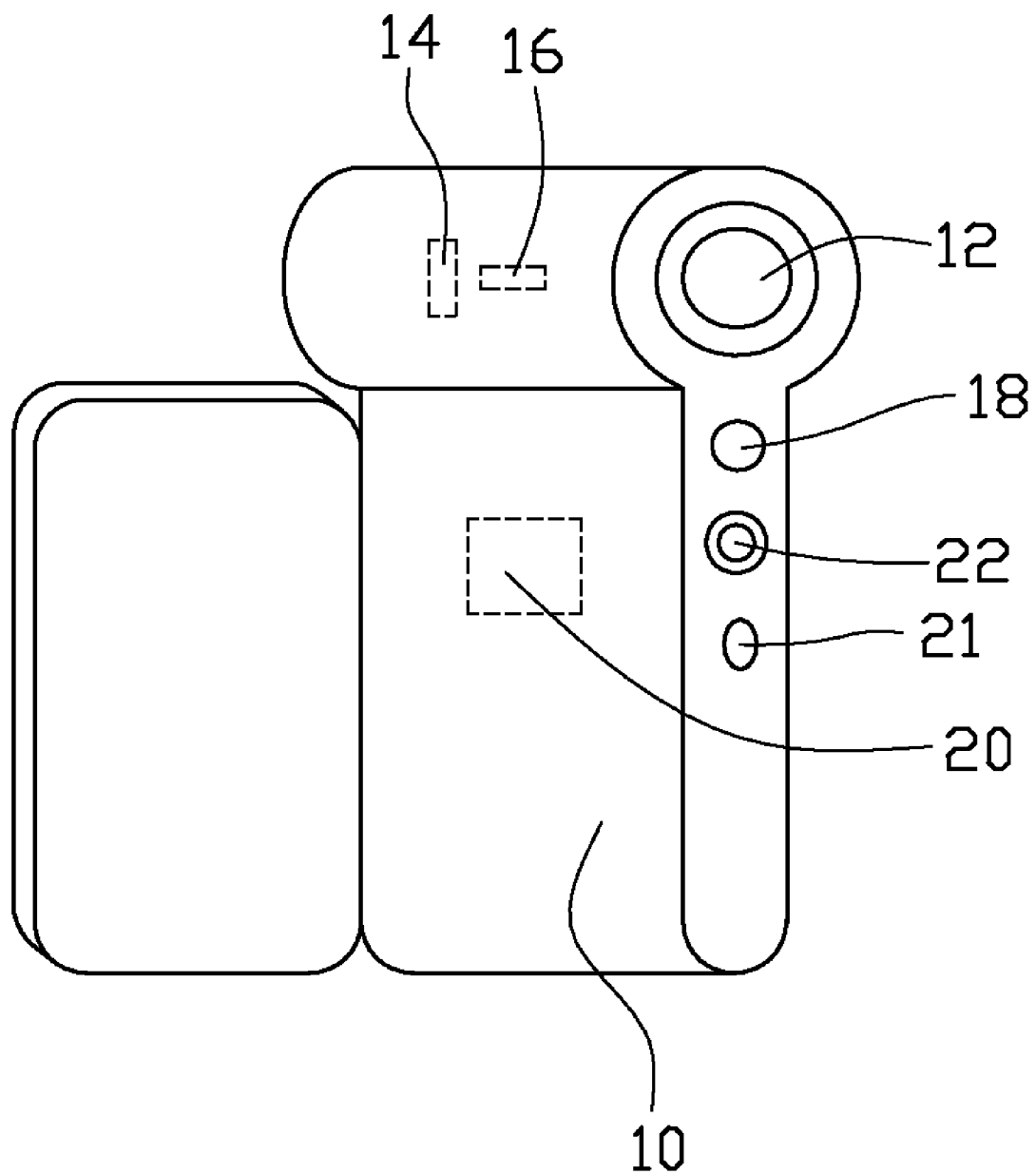
FIG. 7 is a schematic view of a mobile communication terminal in accordance with another embodiment of the present invention.

Referring to FIG. 7, the mobile communication terminal 1 of the present embodiment further includes an infrared lens module 22 disposed on the body 10 and coupled to the processor 20. The infrared lens module 22 facilitates picking up of images in darkness. Thus, such mobile communication terminal 1 with the infrared lens module 22 has a great capacity to be operated in different environments, e.g. in the night. In the present embodiment, the infrared lens module 22 can be used alone to perform picking up of images or can be used to aid the lens module 12 to capture images. When the infrared lens module 22 cooperates with the lens module 12, the processor 20 is configured to integrate image signals detected from the infrared lens module 22 with those detected from the lens module 12.

In conclusion, the mobile communication terminal utilizes the first acceleration sensor and the second acceleration sensor to detect accelerations of the lens module in the first direction and in the second direction, respectively. The displacement of the image signals can be obtained based on values of the accelerations. Accordingly, the image blurred by vibration can be restored by integrating the image signals representing the same position of the object but detected at different sites of the image sensor over the exposure time.

Finally, it is to be understood that the above-described embodiments are intended to illustrate rather than limit the invention. Variations may be made to the embodiments without departing from the spirit of the invention as claimed. The above-described embodiments illustrate the scope of the invention but do not restrict the scope of the invention.

What is claimed is:

1. A mobile communication terminal, comprising:
   a body;
   a lens module disposed on the body and configured for picking up an image of an object;
   a first acceleration sensor disposed on the body configured for measuring a first acceleration of the lens module in a first direction;
   a second acceleration sensor disposed on the body to measure a second acceleration of the lens module in a second direction;
   a range finder disposed on the body to measure a distance from the object to the lens module; and
   a processor electrically coupled to the range finder, the first acceleration sensor and the second acceleration sensor, the processor being configured to restore the image blurred by vibration of the lens module by detecting displacement of signals of the image of the object and then integrating the signals of the image shifted with those at the beginning of exposure based on values of the distance, the first acceleration, and the second acceleration.

2. The mobile communication terminal as claimed in claim 1, further comprising:
   an infrared lens module disposed on the body and coupled to the processor.

3. The mobile communication terminal as claimed in claim 1, wherein the range finder is an infrared range finder, a laser infrared range finder or an ultrasonic range finder.

4. The mobile communication terminal as claimed in claim 1, wherein the first acceleration sensor is a piezoresistive acceleration sensor, a capacitive acceleration sensor, a pendulous acceleration sensor, or a tunnel acceleration sensor.

5. The mobile communication terminal as claimed in claim 4, wherein the piezoresistive acceleration sensor comprises a base, at least one diaphragm, at least one mass, and at least one piezoresistive element, an end of the diaphragm is fastened to one side of the base, an opposite end of the diaphragm is connected with the mass, the piezoresistive element is attached on the diaphragm, the piezoresistive element is electrically coupled to a Wheatstone bridge circuit.

6. The mobile communication terminal as claimed in claim 1, wherein the second acceleration sensor is a piezoresistive acceleration sensor, a capacitive acceleration sensor, a pendulous acceleration sensor, or a tunnel acceleration sensor.

7. The mobile communication terminal as claimed in claim 6, wherein the piezoresistive acceleration sensor comprises a base, at least one diaphragm, at least one mass, and at least one piezoresistive element, an end of the diaphragm is fastened to one side of the base, an opposite end of the diaphragm is connected with the mass, the piezoresistive element is attached on the diaphragm, the piezoresistive element is electrically coupled to a Wheatstone bridge circuit.

8. The mobile communication terminal as claimed in claim 1, wherein the first acceleration sensor or the second acceleration sensor is connected with the lens module.

9. The mobile communication terminal as claimed in claim 1, wherein the first direction and the second direction are perpendicular to each other.

10. The mobile communication terminal as claimed in claim 1, wherein a displacement of the lens module is obtained based on values of the first acceleration and the second acceleration.

11. The mobile communication terminal as claimed in claim 10, wherein a displacement $D_n$ of the image is obtained by the following equation:

$$D_n = \frac{\Delta S \times (S_1 + S_2)}{S_1} - \Delta S$$

where $\Delta S$ is the displacement of the lens module, $S_1$ is the distance from the object to the lens module, and $S_2$ is the distance from the image to the lens module.

12. The mobile communication terminal as claimed in claim 11, wherein the processor is configured to integrate the signals of the image according to the displacement $D_n$ of the image.

* * * * *